(12) United States Patent
Ku et al.

(10) Patent No.: US 8,026,908 B2
(45) Date of Patent: Sep. 27, 2011

(54) ILLUMINATED SURROUND AND METHOD FOR OPERATING SAME FOR VIDEO AND OTHER DISPLAYS

(75) Inventors: Hans Ku, Los Angeles, CA (US); Jonathan Egstad, Santa Monica, CA (US); John Hanashiro, San Francisco, CA (US); Karl Rasche, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 1056 days.

(21) Appl. No.: 11/702,786

(22) Filed: Feb. 5, 2007

(65) Prior Publication Data
US 2008/0186707 A1    Aug. 7, 2008

(51) Int. Cl.
*G09G 5/00* (2006.01)
(52) U.S. Cl. ........................ 345/207; 345/204
(58) Field of Classification Search .................. 345/204, 345/207, 102; 349/61–71; 362/600–634
See application file for complete search history.

(56) References Cited

U.S. PATENT DOCUMENTS

| | | | |
|---|---|---|---|
| 5,760,540 A | 6/1998 | Duistermaat | |
| 6,481,851 B1 | 11/2002 | McNelley et al. | |
| 7,026,597 B2 * | 4/2006 | Cok | 250/214 AL |
| 7,557,518 B2 * | 7/2009 | Zagar et al. | 315/291 |
| 2004/0012556 A1 * | 1/2004 | Yong et al. | 345/102 |
| 2005/0024538 A1 | 2/2005 | Park et al. | |
| 2006/0256037 A1 * | 11/2006 | Kerr | 345/30 |
| 2007/0052664 A1 * | 3/2007 | Hirakata et al. | 345/102 |

FOREIGN PATENT DOCUMENTS
WO    WO-01/84225 A2    11/2001

OTHER PUBLICATIONS

Fairchild, M.D. (1995). "Considering the Surround in Device-Independent Color Imaging," *Color Research and Application* 20:352-363, located at <http://www.cis.rit.edu/fairchild/PDFs/PAP02.pdf>.

* cited by examiner

*Primary Examiner* — Nitin Patel
(74) *Attorney, Agent, or Firm* — Morrison & Foerster LLP

(57) ABSTRACT

In a video or other screen display apparatus, a surround to the actual screen is provided whose light output is variable in order to compensate for the effect of ambient (room) illumination on apparent contrast and chroma of the displayed image. The relationship between ambient light level and the surround illumination is an inverse power function. This provides the effect of making the viewer perceive that the entire room is brighter than it actually is, resulting in a desirable change in his perception of brightness. Thereby, the chromaticity of the surround is variable to allow a match to the calibrated white point of the video display. The apparatus includes an ambient light sensor whose output signal is provided to a control system driving the illuminated surround.

26 Claims, 2 Drawing Sheets

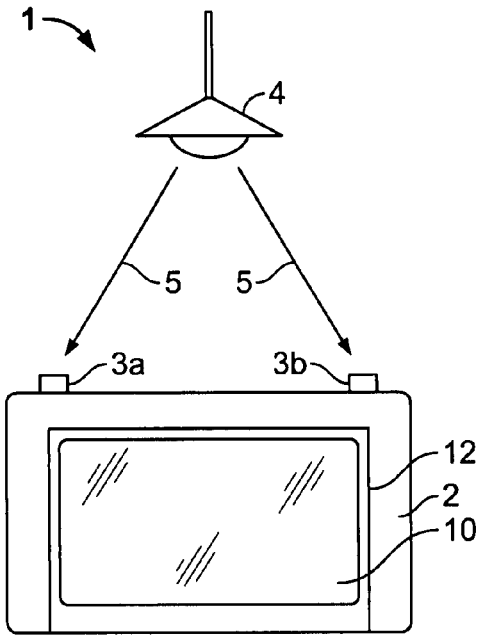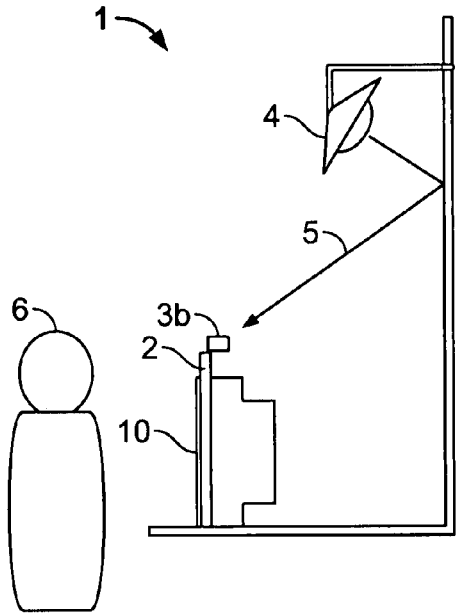
FIG. 1
FIG. 2
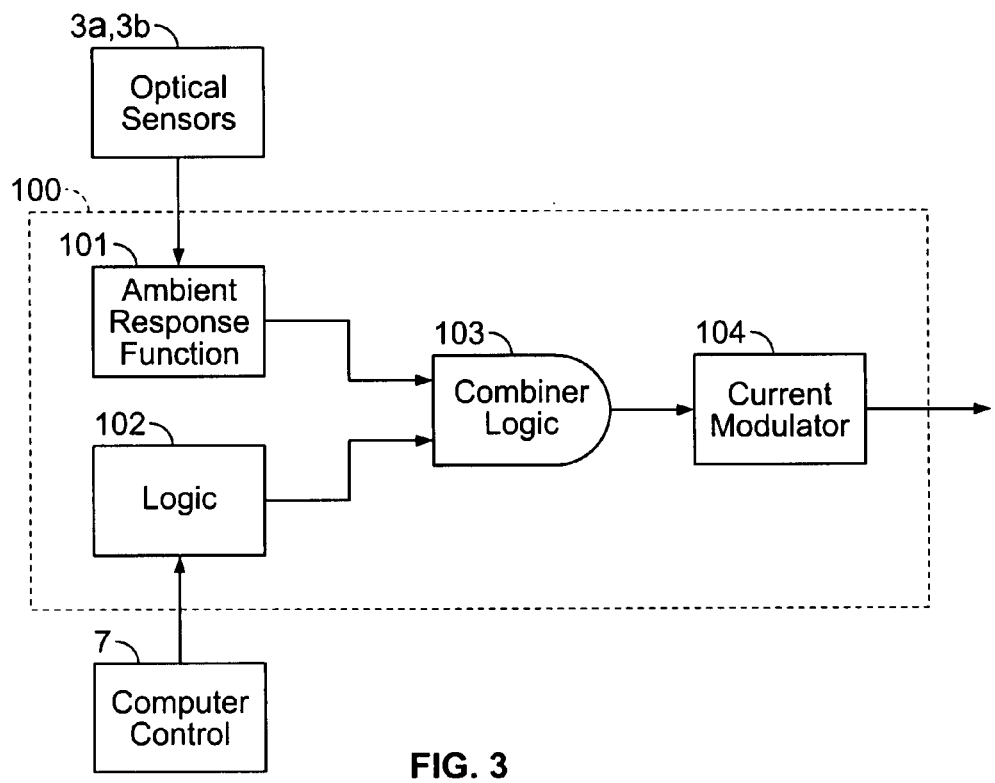
FIG. 3

ILLUMINATED SURROUND AND METHOD FOR OPERATING SAME FOR VIDEO AND OTHER DISPLAYS

FIELD OF THE INVENTION

This disclosure relates generally to video and other types of image displays, and to improving view ability of same.

BACKGROUND

It is well known that human perception of the brightness of a stimulus is significantly affected by the relative luminance of the background. This is illustrated in the familiar optical illusion of comparing a gray square surrounded by black to another gray square of the same darkness level surrounded by white. The gray square surrounded by white will appear darker than the one surrounded by black.

This same problem exists in the field of video and similar displays, for instance large screen televisions, movie theaters using electronic displays, etc. See "Considering the Surround in Device-Independent Color Imaging", Mark D. Fairchild, Color Research and Application, Vol. 20, p. 352-363 (1995) incorporated by reference herein. This points out that changes in the surround of a video display effect the perception of the display. In other words, it is known that the relative luminance of the surround has an impact on the apparent contrast of the image on the display.

SUMMARY

The above scientific principles are applied here, whereby light output of the surround of a video display is varied to compensate for changes in ambient illumination. The surround light output is changed to counteract the effect of ambient illumination (or lack thereof) on apparent contrast and chroma of the displayed image, thus better matching the intended contrast and chroma of the image. Or, the surround light output is set to compensate for deficiencies in the capability of the display technology used, for example, the heightened black point of an LCD display and resulting lack of contrast in dark portions of a viewed image. By "ambient illumination" is meant the illumination overall in the room or surroundings. In accordance with the invention, the relationship between the ambient illumination and the degree of illumination provided by the display surround is set to be an inverse function. Thus if the ambient light level is high, the light level of the surround is low and if the ambient light level is low, the surround light level is set to be high. Thus by illuminating the surround of a display, e.g. a video display such as an LCD or plasma screen display or rear projection or cathode ray tube, or DLP rear projection screen, or OLED or SED, this scientific principle is used to address two common problems recognized by the present inventors with many current display technologies, including large screen televisions such as LCDs or plasma displays. The first problem is that the black level of an LCD display is elevated reducing apparent contrast undesirably, and second, darkened ambient light viewing conditions typical of digital material, for instances movies, exacerbates this problem.

Previous solutions to this are inadequate. For instance, it is known to rely on the reflection of light from walls or other objects behind the display to create an illuminated surround, by use of reflection. There are problems with this approach. First, it is difficult to ensure a particular level, quality or uniformity of illumination. Second, it is difficult to ensure a particular level, quality or uniformity of illumination between different displays that are in different locations. Third, the illumination is not provided directly adjacent to the image displayed on the screen since it is typically separated by a non-illuminated bezel of some width around the actual display screen.

In accordance with this invention, there is provided direct illumination of the area immediately surrounding or very close to the display screen, and the amount of illumination (brightness) and its color are controlled and determinate. Thus the quality and uniformity of illumination are controlled without affecting the image itself as displayed. In one embodiment, the display screen is surrounded with a flat electroluminescent area of material on three or four sides of the display screen, extending from the edge of the display's viewable area. The amount and chromaticity (chroma) of the illumination are controlled by the combination of an ambient light sensor and a control process, such as provided by software or hardware logic or a microprocessor, using a model describing the degree of illumination needed to offset both the display's native characteristics and the amount of ambient light sensed.

In one embodiment, the electroluminescent material of the surround has its light level set to generate light having a color of a specific white point, thus serving as a white reference for the viewer of the display. This counters another characteristic of human vision perception called "chromatic adaptation" that can affect color choices in digital video material.

BRIEF DESCRIPTION OF THE DRAWINGS

FIG. 1 shows a front view of a display apparatus in accordance with this invention.

FIG. 2 shows a side view of the apparatus of FIG. 1.

FIG. 3 shows a block diagram of the display apparatus control circuitry and sensors in accordance with this invention.

DETAILED DESCRIPTION

Figure 4A:
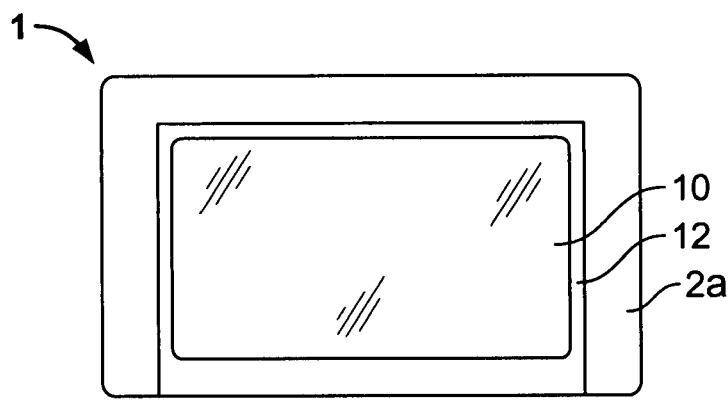
FIGS. 4A to 4D show different arrangements of the surround in accordance with this invention.

In accordance with this disclosure, light output of the surround of a video or other image display is allowed to vary under control to compensate for changes in sensed ambient illumination levels. The width of the surround is set to be sufficient to desirably cause the viewer's vision to observe that the entire room is brighter than it actually is, resulting in a desirable change in the observer's lightness perception. In one embodiment assuming a medium sized television (e.g., LCD) display screen being 24" (61 cm) in diameter diagonally and filling 60° of the viewer's field of view, a typical minimum width of each portion of the surround is 5° of the field of view (FOV) along each of three edges of the screen, for instance each side and the top.

It has been determined that undesirable optical flare effects from the surround being immediately adjacent to the viewable image can be reduced or eliminated by adding a black gap or spacing between the illumination source (surround) and the perimeter of the actual active video display screen. If the gap is too large this may significantly increase the overall display size and undesirably occupy too much of the observer's available field of view. Hence it is preferred that the gap is the minimum width required to reduce flare to an acceptable level. (Flare is most noticeable while viewing video content with mostly dark (low light level) images.) The gap is not needed if the display technology employed sufficiently resists flare. The preferred configuration is without a gap.

One configuration for optimum effectiveness is to have the surround extend along all four sides of the display. However the actual configuration can vary; it may be around all but the bottom, only along the top, or only along the sides. This depends on the nature of the display and the overall ambient light level, in other words the intended use of the display.

Another embodiment may employ as the "surround" only a single strip shaped element having variable intensity to compensate for decreased field of view coverage, such as for a small display.

The color of the surround is also varied in one embodiment to allow a match to the calibrated white point (chromaticity) of the display. White point is a well-known feature of video or other displays. A benefit of this is to enhance the stability of the viewer's chromatic adaptation since the viewer will have a fixed white reference point to adapt to rather then adapting to varying image content.

Thus FIG. 1 shows a front view of a video or other image display 1 in accordance with this disclosure where the video image is displayed on the screen 10, with illuminated surround area 2. The above-described black gap 12 is provided between the illuminated surround 2 and the video image area of screen 10. Provided in this case near the top portion of the display apparatus 1 are two ambient light sensors 3a, 3b which are, for instance, photo-cells. In this case, the room ambient light source shown as a hanging lamp 4 is not part of the apparatus. The ambient light rays 5 thus pass from the source 4 onto sensors 3a, 3b.

A side view of this apparatus in FIG. 2 also shows the display viewer 6.

FIG. 3 shows the associated control system including surround driver 100 which includes several elements, including the ambient response function logic 101 which receives from the optical sensors 3a, 3b a signal indicating the level of sensed ambient light. The output signal from the ambient response function logic 101 is provided as a first input signal to a combiner logic 103. A computer control 7 is also provided which sets the color of the surround. This is conventionally computer or microprocessor controlled, as is the target white point setting. A control on the surround with a numeric readout may also be used. This control may be a wireless remote or attached directly on the display. The user would likely set this in their existing display calibration tool as the target white point. This white point would then be used as the setting for the surround as well. The computer control 7 sets chromaticity logic 102, which determines the display screen 10 white point. This white point determination is then provided by logic 102 to the combiner logic 103 which combines the indicated response to the ambient light with a chromaticity desired, to set a current modulator 104 which in turn sets a level of electric current to the illuminated surround 2. Typically the illuminated surround 2 is a panel, or several panels, of RGB LED arrays capable of matching the display's maximum luminance and matching a variety of white points. These panels may be constructed from commercially available RGB LED array modules, such as those used for signage or display backlights. The LEDs would be located behind an optically neutral, diffusive panel, such that the individual LED colors would not be seen.

Note that the ambient response logic 101 receives the signal from the ambient light sensor indicating the ambient light level and applies a transform function, for instance, an inverse power function, thereto. The chromaticity control logic 102 generates three RGB (red-green-blue) amplitude signals to set the color of the surround illumination source. The chromaticity would be determined by the ratio of R to G to B. The combiner logic 103 modulates the output signals from logic 101 with those from logic 102 and creates the final three RGB amplitude signals to control the surround 2. The current modulator 104 modulates the surround illumination source's input current by the RGB amplitude signals. Thus in one embodiment the surround itself is a color device capable of providing any one of a number of colors at any one of a number of intensities. In the embodiment that targets chromatic adaptation, it only shows one chromaticity at any one point in time. However, typically the surround at any one time is of only one color and thus is uniformly illuminated both in terms of its color and brightness. In the embodiment that targets only the improvement in the perception of contrast, only intensity level (brightness) need be adjusted. In other embodiments, the surround has a fixed chromaticity (white point) and varies only in intensity. For an RGB-type surround, the surround itself may be an LCD or LED or plasma device. This may be implemented by putting RGB filters in front of alternating color strips of electroluminescent material.

The relative width of the surround 2 is partly a matter of design choice. In one embodiment it would occupy, for instance, about 5° of field of view along each of the three sides of the video image area 12. That is 5° in terms of the field of view of the viewer, where a typical width of the video image area of screen 10 to the viewer would be 60° when the viewer is at a normal viewing distance. Thus typically each panel or segment of the surround 2 subtends about 1/12th of the width of the video image area of screen 10. However this is not limiting.

Further, the ambient response logic 101 in one embodiment is such that it exhibits some hysteresis. Also its response may be time averaged to slow its reaction time down to, e.g., 2 to 4 seconds before a change in the surround light level is perceivable to the viewer. This is intended to be slow enough to avoid responding to momentary changes in the sensed ambient light level. A faster response would likely cause the surround to flicker and thus be annoying.

In one embodiment, the response to the sensed ambient light by logic 101 is an inverse power function. It is typically non-linear, due to the non-linear nature of human vision. The ambient response function logic 101 and chromaticity logic 102 may be embodied in hardware, software, firmware or combinations thereof, etc., as is also the case with combiner logic 103.

Figure 4B:
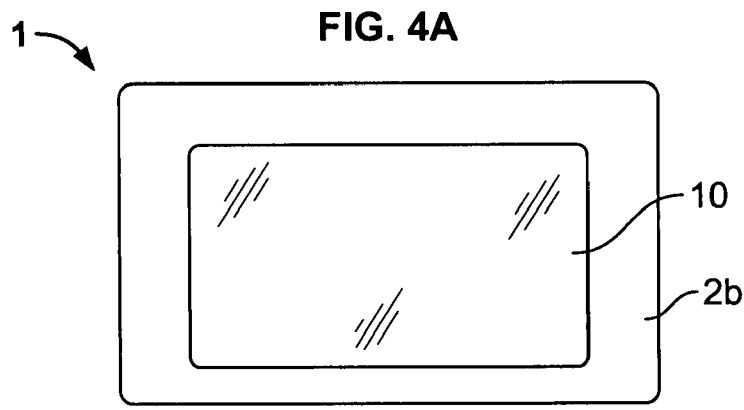
Figure 4C:
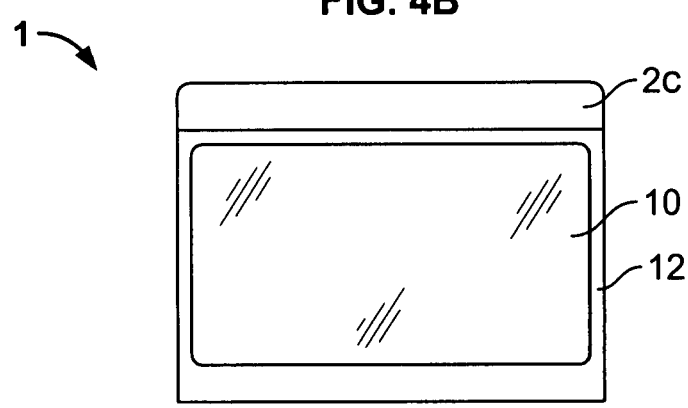
Figure 4D:
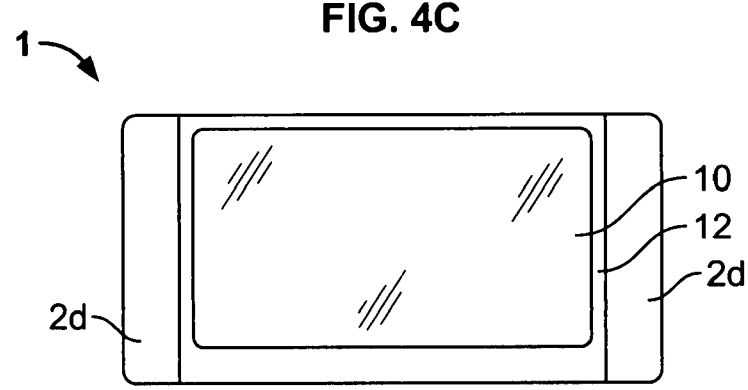

FIGS. 4a to 4d shows several variations in the surround arrangement, corresponding to the view of FIG. 1 of apparatus 1. Illustrated are differences in the configuration of the black gap 12, which is not present in the FIG. 4b version. The other difference is in the configuration of the surrounds respectively 2a, 2b, 2c and 2d, which as shown is located on three edges of the display, four edges of the display, top of the display only or sides of the display only, respectively.

This disclosure is illustrative and not limiting; further modifications will be apparent to one skilled in the art in light of this disclosure and are intended to fall within scope of the appended claims.

What is claimed as new and desired to be protected by Letters Patent of the United States is:

1. A display apparatus comprising:
   a screen adapted to display an image;
   an illuminated surround adjacent at least one edge of the screen and visible to a viewer of the screen wherein light from the surround is directed directly to the viewer;
   an ambient light sensor located near the screen; and
   a control coupled to the sensor and to the surround and which generates red, green, and blue signals to set an intensity and color of the surround, thereby to control a brightness and chromaticity of the surround responsive to the sensed ambient light level, wherein chromatic adaptation is countered and apparent contrast improved.

2. The apparatus of claim 1, wherein the screen is one of an LCD, SED, OLED, plasma, rear projection, front projection, or cathode ray tube.

3. The apparatus of claim 1, wherein the surround includes an illuminated panel.

4. The apparatus of claim 3, wherein the panel includes a source of red, green, and blue illumination and a diffuser.

5. The apparatus of claim 1, wherein a portion of the surround which is illuminated is spaced apart from the screen by a black area.

6. The apparatus of claim 1, wherein the control responds to a change in the sensed ambient light level over a time of at least two seconds.

7. The apparatus of claim 1, wherein the control responds to a change in the ambient light level in a time-averaged fashion.

8. The apparatus of claim 1, wherein the surround includes at least three portions, each adjacent one edge of the screen and each portion subtends at least $1/14$ of the viewer's field of view of the screen.

9. The apparatus of claim 1, wherein illumination of the surround is also a function of a white point of the display.

10. The apparatus of claim 1, wherein the sensor includes two spaced apart sensor elements, each located behind the screen relative to the viewer of the screen, and at or near a top of the screen.

11. The apparatus of claim 1, wherein the control sets the brightness of the surround as an inverse relation to the sensed level of ambient light.

12. The apparatus of claim 11, wherein the relation is a power function.

13. The apparatus of claim 1, wherein the control is also responsive to a black point of the display.

14. A method comprising the acts of:
displaying an image on a screen;
providing an illuminated surround adjacent at least one edge of the screen and which is visible to a viewer of the screen wherein light from the illuminated surround is directed directly to the viewer;
sensing a level of ambient light near the screen; and
controlling a brightness and chromaticity of the illuminated surround by generating red, green, and blue signals to set an intensity and color of the surround, responsive to the sensed ambient light level, wherein chromatic adaptation is countered and apparent contrast improved.

15. The method of claim 14, wherein the screen is an LCD, SED, OLED, plasma, rear projection, front projection, or cathode ray tube.

16. The method of claim 14, wherein the illuminated area includes an illuminated panel.

17. The method of claim 14, wherein the illuminated area is spaced apart from the screen by a black area.

18. The method of claim 14, wherein the controlling responds to a change in the sensed ambient light level over a time of at least two seconds.

19. The method of claim 14, wherein the controlling responds to a change in the ambient light level in a time-averaged fashion.

20. The method of claim 14, wherein the illuminated area includes at least three portions, each adjacent one edge of the screen and each portion subtends at least $1/14$ of the viewer's field of view of the screen.

21. The method of claim 14, wherein the controlling is also a function of a white point of the screen.

22. The method of claim 14, wherein the sensing includes providing two spaced apart sensor elements, each located behind the screen relative to the viewer of the screen, and at or near a top of the screen.

23. The method of claim 14, wherein the controlling sets the brightness of the surround as an inverse relation to the sensed level of ambient light.

24. The method of claim 23, wherein the relation is a power function.

25. The method of claim 23, wherein the illuminated panel includes a source of red, green, and blue illumination and a diffuser.

26. The method of claim 14, wherein the controlling is also responsive to a black point of the screen.

* * * * *

UNITED STATES PATENT AND TRADEMARK OFFICE
CERTIFICATE OF CORRECTION

| | | |
|---|---|---|
| PATENT NO. | : 8,026,908 B2 | |
| APPLICATION NO. | : 11/702786 | |
| DATED | : September 27, 2011 | |
| INVENTOR(S) | : Hans Ku et al. | |

It is certified that error appears in the above-identified patent and that said Letters Patent is hereby corrected as shown below:

In column 3, line 16, delete "then" and insert -- than --

Signed and Sealed this
Twenty-seventh Day of December, 2011

David J. Kappos
*Director of the United States Patent and Trademark Office*